(12) United States Patent
Riggi, Jr. et al.

(10) Patent No.: US 8,696,309 B2
(45) Date of Patent: Apr. 15, 2014

(54) BRAZED TURBINE SEAL

(75) Inventors: Vincent T. Riggi, Jr., Saratoga Springs, NY (US); Barry Monshower, Clifton Park, NY (US); Justin D. Hyslop, Waterford, NY (US)

(73) Assignee: Turbine Services Ltd., Saratoga Springs, NY (US)

( * ) Notice: Subject to any disclaimer, the term of this patent is extended or adjusted under 35 U.S.C. 154(b) by 512 days.

(21) Appl. No.: 13/169,253

(22) Filed: Jun. 27, 2011

(65) Prior Publication Data
US 2012/0328419 A1 Dec. 27, 2012

(51) Int. Cl.
*F01D 11/00* (2006.01)
(52) U.S. Cl.
USPC .............. 415/191; 415/211.2; 415/173.1; 277/637; 277/651; 277/654
(58) Field of Classification Search
CPC ................................. F01D 11/006; F16J 15/02
USPC ............ 415/191, 211.2, 173.1; 277/407, 651, 277/654, 637
See application file for complete search history.

(56) References Cited

U.S. PATENT DOCUMENTS

| | | | | |
|---|---|---|---|---|
| 5,509,669 A | * | 4/1996 | Wolfe et al. | 277/654 |
| 5,657,998 A | * | 8/1997 | Dinc et al. | 277/653 |
| 5,934,687 A | * | 8/1999 | Bagepalli et al. | 277/637 |
| 2003/0039542 A1 | * | 2/2003 | Cromer | 415/135 |

* cited by examiner

*Primary Examiner* — Ninh H Nguyen
(74) *Attorney, Agent, or Firm* — Wood, Phillips, Katz, Clark & Mortimer

(57) ABSTRACT

A gas leakage seal for a turbine, including first and second cloth layers having woven warp and weft wires, wherein the first and second cloth layers are brazed together by a flux paste whereby the cloth layers have their edges aligned and the brazing substantially seals gaps between the wires along substantially the entire length and width of the brazed together cloth layers. Weld beads having a thickness greater than the combined thickness of the brazed together cloth layers connect the edges of the cloth layers along their length. The turbine includes two members with aligned recesses in which opposite of the weld beads are received. The seal is made by brushing a nickel and/or cobalt based flux paste on one side of one of the cloth layers, brazing that cloth layer to a side of the second cloth layer to substantially seal the gaps between the wires, and creating weld beads with an electron beam to connect the edges of the cloth layers along their length.

28 Claims, 4 Drawing Sheets

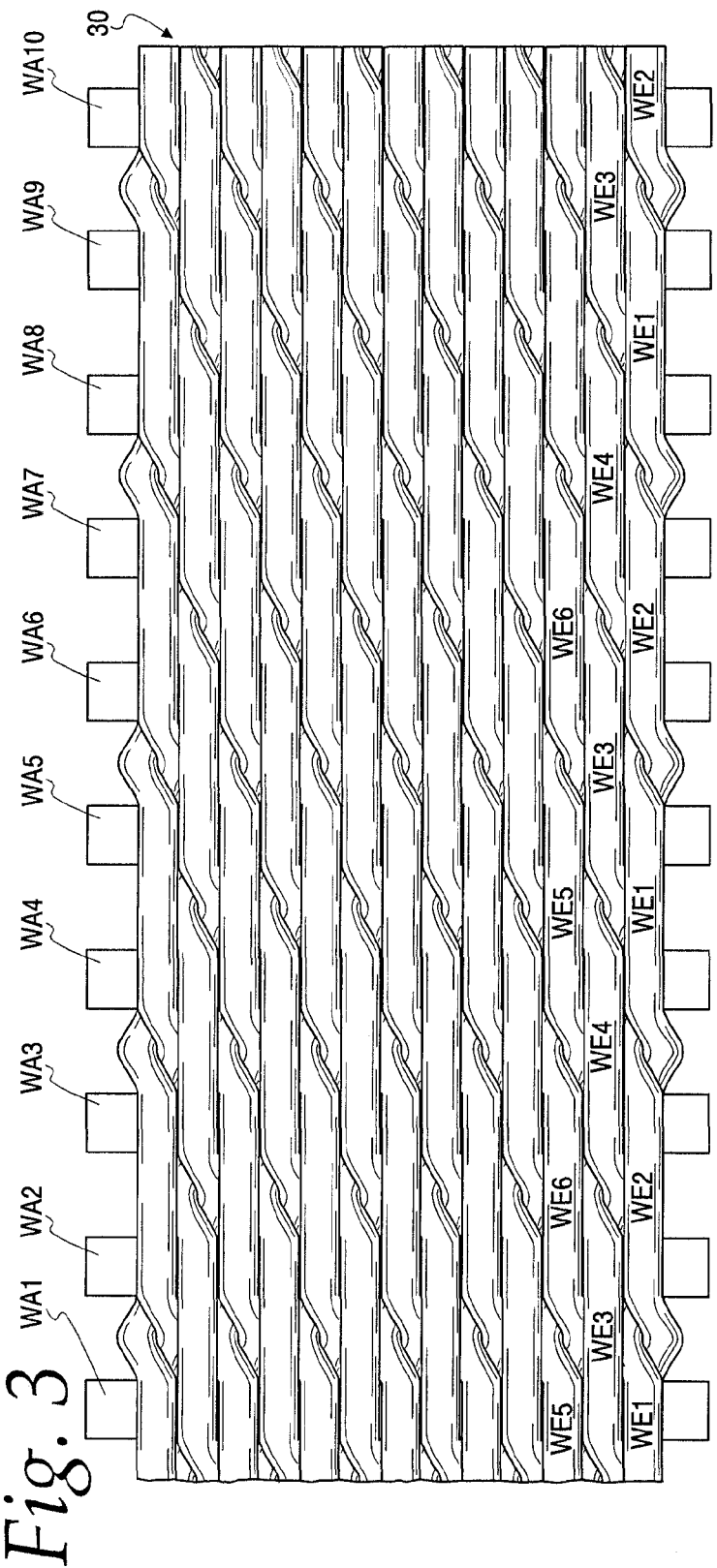
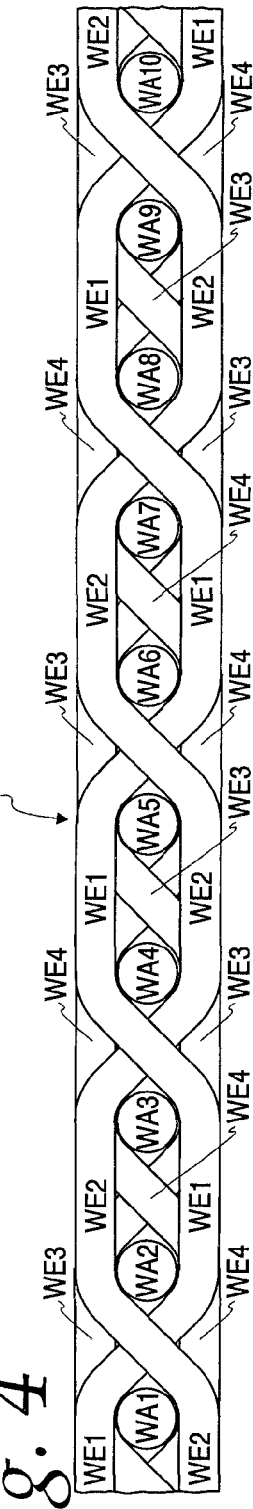
Fig. 3
Fig. 4

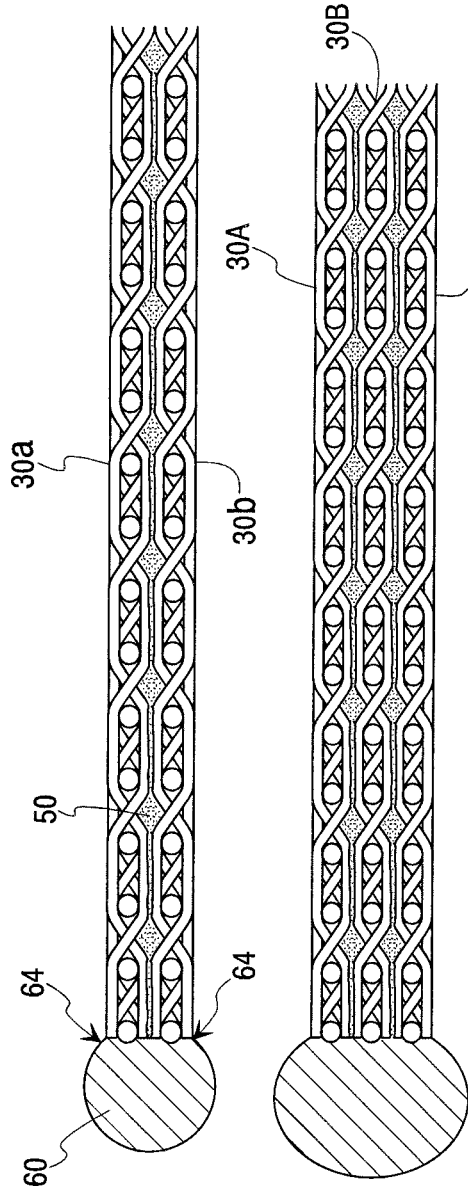
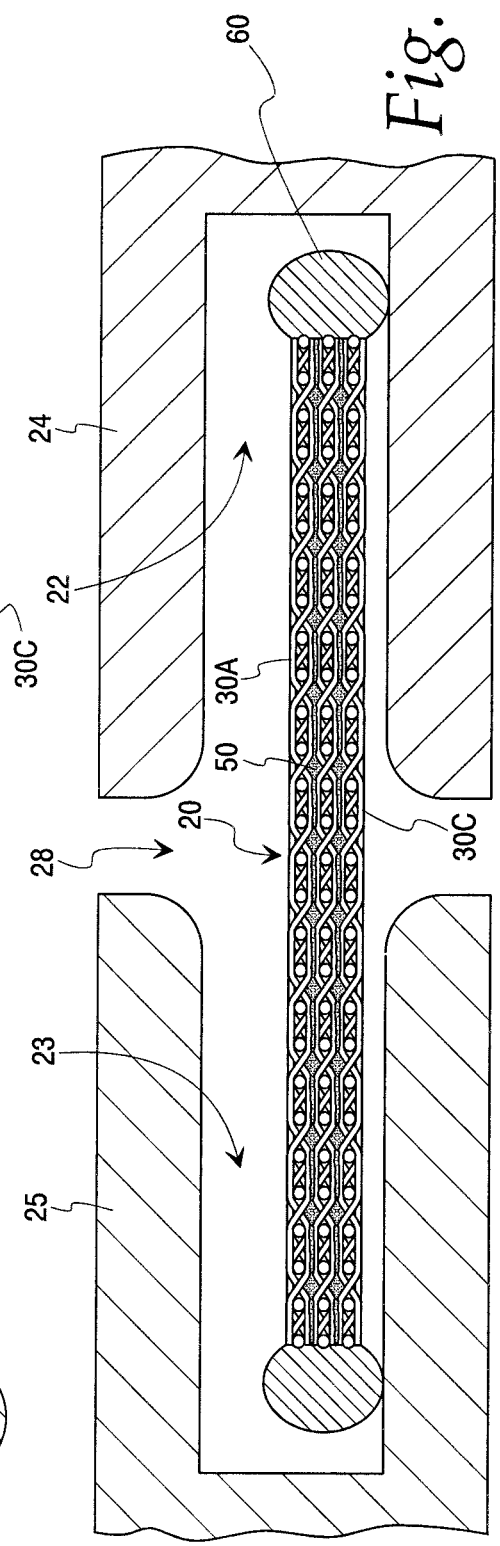

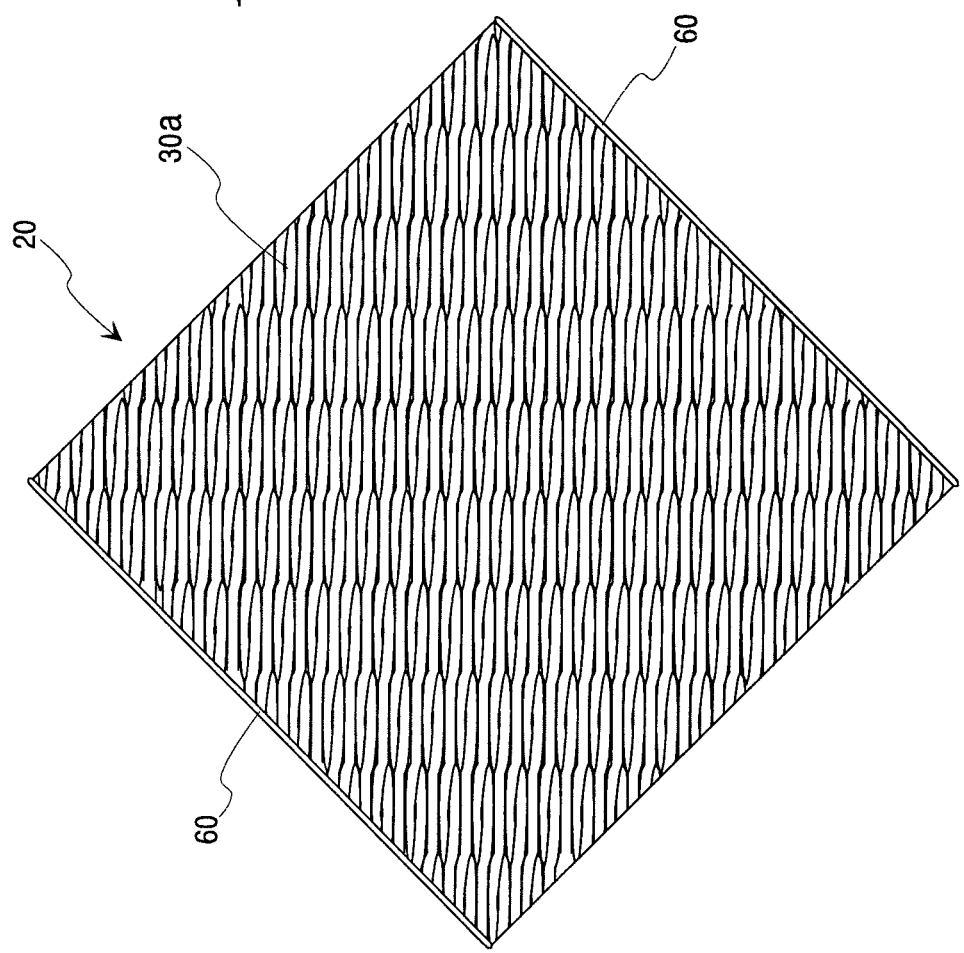

BRAZED TURBINE SEAL

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates generally to gas turbines, and more particularly to a gas-path leakage seal for a gas turbine.

BACKGROUND OF THE INVENTION

Gas turbines are well known and included, for example, in various power generation equipment and aircraft engines. Gas turbines typically have a gas path which can be subject to undesirable gas leakage, either into or out of the gas path, from an area of higher pressure to an area of lower pressure.

For example, leakage can occur through gaps between gas turbine subassemblies (e.g., through gaps between the combustor and the turbine) and/or through gaps between the components that make up a gas turbine subassembly (e.g., through gaps between combustor casing segments) which have surfaces of different shapes, can suffer from assembly misalignment, and undergo vibration. Moreover, components typically experience different hot gas flow and thus will typically undergo different thermal growths.

Such leakage is undesirable for a variety of reasons, including the fact that it can lower the efficiency of the gas turbine (leading to increased fuel costs) and/or require an increase in burn temperature to maintain a power level (leading to increased pollution).

Leaf seals made of metal have been used to reduce such leakage, though such seals have been found to leak an amount sufficient to increase fuel costs and/or increase pollution.

Alternative seals using cloth layers formed of wire mesh and variously disposed on opposite sides of a foil layer or metal sheet have also been used, as shown, for example, in U.S. Pat. Nos. 5,509,669, 5,586,773, 5,657,998 and 5,934,687.

U.S. Pat. No. 5,509,669, for example, discloses various seals with weld beads permeating the cloth layers and attaching to the foil layer and/or with the cloth layers generally enclosing the foil layer but leaving an edge of the foil layer exposed.

U.S. Pat. No. 5,586,773 discloses a particular cloth structure for such seals in which particular dimensions of center-to-center spacing and wire diameters are used whereby, in effect, the wires of at least one of the warp or weft wires would generally have significant spacing therebetween.

U.S. Pat. No. 5,657,998 also discloses seals in which cloth mesh layers are disposed on opposite sides of a foil layer (or layers), with the cloth layers also being wrapped around the edges of the foil layer(s). The cloth layers are spot welded on the foil layer (or in some instances having brackets are secured by a compressive fit).

U.S. Pat. No. 5,934,687 similarly discloses seals with cloth mesh layers on opposite sides of a metal sheet, with the metal sheet extending beyond the cloth on opposite edges to form curved portions having longitudinally extending portions which are equidistantly above and below the cloth layers. The cloth layers are spot or seam welded on opposite sides of the metal sheet.

The present invention is directed to providing a seal against gas leakage in gas turbines which not only reliably provides suitable sealing against undesirable leakage, but also allows use of manufacturing processes which are easy to use, inexpensive, and provide reliable, consistent seals.

Other objects, features, and advantages of the invention will become apparent from a review of the entire specification, including the appended claims and drawings.

SUMMARY OF THE INVENTION

In one aspect of the present invention, a seal for generally sealing a gas-path leakage-gap between spaced-apart first and second members of a turbine is provided, including first and second cloth layers having woven warp and weft wires, wherein the first and second cloth layers are brazed together by a flux paste whereby the cloth layers have their edges aligned and the brazing substantially seals gaps between the wires along substantially the entire length and width of the brazed together cloth layers. Edge connectors having a thickness greater than the combined thickness of the brazed together cloth layers connect the edges of the cloth layers along their length.

In one form of this aspect of the present invention, the wires are cobalt based and the cloth layers are each about 0.03 inches thick.

In another form of this aspect of the present invention, the wires of said first and second cloth layers are woven in a Dutch twill weave. In a further form, each of the cloth layers have about 220 weft wires per inch and 40 warp wires per inch, with the weft wires having a diameter of about 0.0084 inch and the warp wires having a diameter of about 0.0105 inch.

In still another form of this aspect of the present invention, the flux paste includes nickel, and the brazed connection of the cloth layers comprises the nickel of the flux paste filling gaps in the cloth via capillary action during brazing and forming a metallurgical bond with the wires.

In another form of this aspect of the present invention, the flux paste includes cobalt, and the brazed connection of the cloth layers comprises the cobalt of the flux paste filling gaps in the cloth via capillary action during brazing and forming a metallurgical bond with the wires.

In yet another form of this aspect of the present invention, the edge connectors are solid beads from an electron beam weld. In a further form, the solid beads are wires electron beam welded along the edges of the cloth layers. In another further form, the solid beads are cloth wire materials at the edges of the cloths electron beam welded and shaped as a bead.

In still another form of this aspect of the present invention, a third cloth layer having woven warp and weft wires is provided, wherein the second cloth layer is brazed on one side to the first cloth layer and the third cloth layer is brazed to the other side of the second cloth layer by a flux paste with its edges aligned with the edges of the first and second cloth layers. In a still further form, the brazed connection between the second and third cloth layer substantially seals the gaps between the wires along substantially the entire length and width of the brazed together cloth layers.

In another aspect of the present invention, a turbine includes first and second turbine members movable relative to one another with turbine members having a gap therebetween and aligned recesses, and a seal against gas leakage through the gap. The seal has first and second cloth layers having woven warp and weft wires, wherein the first and second cloth layers are brazed together by a flux paste whereby the cloth layers have their edges aligned and the brazing substantially seals gaps between the wires along substantially the entire length and width of the brazed together cloth layers. Edge connectors having a thickness greater than the combined thickness of the brazed together cloth layers connect the edges of the cloth layers along their length. The seal is received in the turbine member recesses with the edge connector on one edge received in the first turbine member recess and the edge connector on the other edge is received in the second turbine member recess.

In one form of this aspect of the present invention, the wires are cobalt based and the cloth layers are each about 0.03 inches thick.

In another form of this aspect of the present invention, the wires of the first and second cloth layers are woven in a Dutch twill weave. In a further form, each of the cloth layers have about 220 weft wires per inch and 40 warp wires per inch, with the weft wires having a diameter of about 0.0084 inch and the warp wires having a diameter of about 0.0105 inch.

In still another form of this aspect of the present invention, the flux paste includes nickel, and the brazed connection of the cloth layers comprises the nickel of the flux paste filling gaps in the cloth via capillary action during brazing and forming a metallurgical bond with the wires.

In another form of this aspect of the present invention, the flux paste includes cobalt, and the brazed connection of the cloth layers comprises the cobalt of the flux paste filling gaps in the cloth via capillary action during brazing and forming a metallurgical bond with the wires.

In yet another form of this aspect of the present invention, the edge connectors are solid beads from an electron beam weld. In a further form, the solid beads are wires electron beam welded along the edges of the cloth layers. In another further form, the solid beads are cloth wire materials at the edges of the cloths electron beam welded and shaped as a bead.

In still another form of this aspect of the present invention, a third cloth layer having woven warp and weft wires is provided, wherein the second cloth layer is brazed on one side to the first cloth layer and the third cloth layer is brazed to the other side of the second cloth layer by a flux paste with its edges aligned with the edges of the first and second cloth layers. In a still further form, the brazed connection between the second and third cloth layer substantially seals the gaps between the wires along substantially the entire length and width of the brazed together cloth layers.

In yet another form of this aspect of the present invention, the seal is movable relative to both the first and second turbine members.

In a further aspect of the present invention, a method of making a seal against gas leakage through a gap between first and second turbine members is provided, including the steps of (a) providing first and second cloth layers each with opposite edges extending a length, each cloth layer having woven warp and weft wires, (b) brushing a flux paste on substantially one entire side of one of the cloth layers, said flux paste being based on a selected one or more of nickel and cobalt, (c) positioning the other of the cloth layers against the one side of the one cloth layer, (d) brazing together the first and second cloth layers with their edges aligned whereby the selected one of nickel and cobalt of the flux paste substantially seals the gaps between the wires along substantially the entire length and width of the brazed together cloth layers, and (e) connecting the edges of the cloth layers with edge connectors along their length, wherein the edge connectors have a thickness greater than the combined thickness of the brazed together cloth layers.

In a further form of this aspect of the present invention, the providing step provides cloth layers which are each about 0.03 inches thick formed of cobalt based wires.

In another form of this aspect of the present invention, each providing step provides cloth layers having about 220 weft wires per inch and 40 warp wires per inch, with the weft wires having a diameter of about 0.0084 inch and the warp wires having a diameter of about 0.0105 inch.

In still another form of this aspect of the present invention, in the brazing step the nickel of the flux paste fills gaps in the cloth via capillary action and forms a metallurgical bond with the wires.

In yet another form of this aspect of the present invention, the edges connecting step comprises electron beam welding forming edge connectors which are weld beads.

BRIEF DESCRIPTION OF THE DRAWINGS

FIG. 3 is a top view of the FIG. 1 metal cloth layer illustrating the arrangement of warp and weft wires;

FIG. 4 is a view from the bottom of the FIG. 3 cloth layer;

FIG. 6 is a cross-sectional view of a portion of a seal according to one embodiment of the present invention, having two metal cloth layers;

FIG. 7 is a cross-sectional view of a portion of a seal according to a second embodiment of the present invention, having three metal cloth layers;

FIG. 8 is a top view of a seal according to the present invention with electron beam welds along two edges; and FIG. 9 is a cross-sectional view showing the seal of FIG. 7 as used to seal a gap between two turbine components.

DETAILED DESCRIPTION OF THE PREFERRED EMBODIMENT

Figure 1:
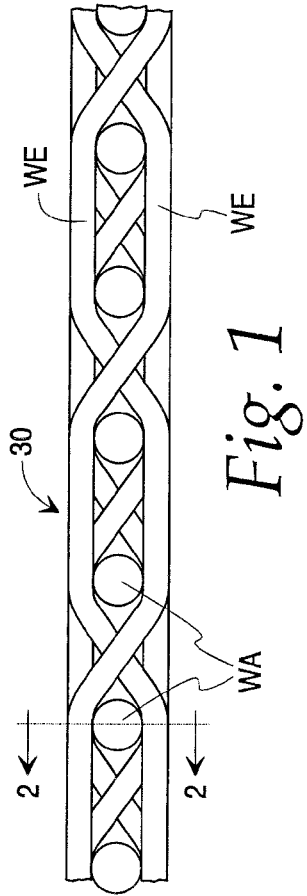
FIG. 1 is a cross sectional view of a metal cloth layer which may be advantageously used with the present invention.
Figure 2:
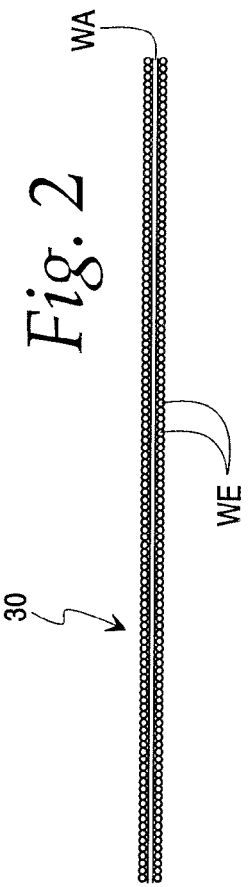
FIG. 2 is a cross-sectional view of the cloth layer taken along line 2-2 of FIG. 1.

The Figures illustrate various features of the present invention relating to an articulating metal cloth seal 20 for high temperature gas turbine applications (e.g., as shown in FIG. 9, the seal 20 may be disposed in recesses 22, 23 in two turbine components 24, 25 to seal a gap 28 between the components 24, 25). The main body of the seal 20 consists of an assemblage of multiple stacked layers of high temperature woven metal cloth, bonded together by metallurgical fusion/capillary action (brazing and/or welding) with sides or ends shaped to fit into and/or seal between parts of a gas turbine. Advantageously, the assemblage of metal cloth will not allow air or gas pressure to pass, with the cloth layers able to articulate with no inherent mechanical or process related weak points.

Woven metal cloth layers 30 which may be advantageously used in the present invention are illustrated in FIGS. 1-4, consisting of a Dutch twill weave of warp (WA1, WA2, . . . ) and weft (WE1, WE2, . . . ) wires. As illustrated, the warp wires WA1, WA2, . . . are substantially straight and oriented parallel to one another at spaced locations. The weft wires WE1, WE2, . . . weave over and under every second warp wire WA1, WA2, . . . , with pairs of adjacent weft wires (WE1-WE2, WE3-WE4, WE5-WE6, . . . ) alternating the warp wires between which they weave over and under. Thus, weft wires WE1 and WE2 (as well as WE5 and WE6, etc.) weave over/under between warp wires WA1 and WA2, WA3 and WA4, WA5 and WA6, etc., while weft wires WE3 and WE4 weave over/under between warp wires WA2 and WA3, WA4 and WA5, etc.

In one advantageous form, cloth layers 30 having a thickness of about 0.030 inch may be used, with warp wires WA having a diameter of 0.0105 inch and weft wires WE having a diameter of 0.0084 inch, with the wires WA, WE forming a mesh of 40 warp wires WA by 220 weft wires WE per square inch. The wires WA, WE may also be advantageously oriented at 45 degrees to the sides of the seal 20 (see FIG. 8). The wires may advantageously be cobalt-based, and more particularly may advantageously be a cobalt alloy known as L-605.

It should be appreciated that while Dutch twill woven cloth layers advantageously provide less openings through the cloth layers than other weaves, cloth layers having other weaves (with more or fewer openings) may also advantageously be used to provide at least some aspects of the present invention.

Figure 5:
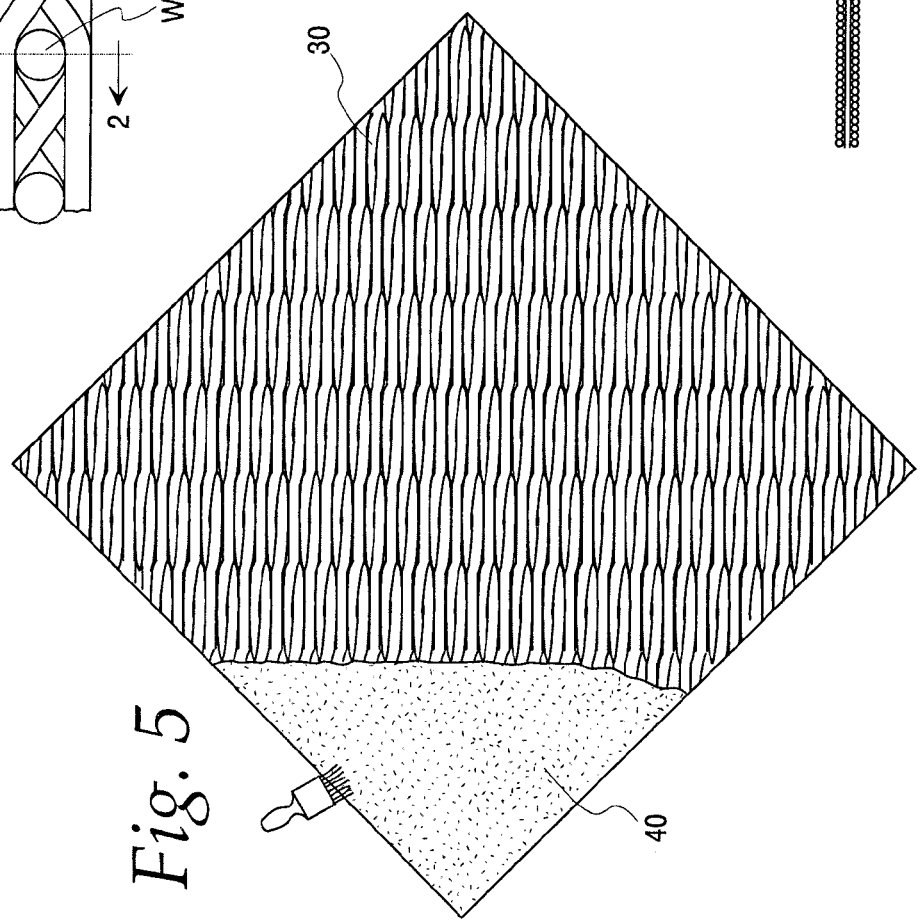
FIG. 5 is a top view of a metal cloth layer such as in FIGS. 1-4 illustrating flux paste partially spread on one surface prior to brazing together with another metal cloth layer.

The seal body is formed of two or more cloth layers 30 bonded together by high temperature furnace brazing, which may be advantageously accomplished using a nickel based flux paste 40 at least one adjacent side of adjacent cloth layers 30 such as illustrated in FIG. 5, with the paste 40 spread on in a suitable manner such as one would butter a piece of toast. However, still other high temperature braze paste could be used, including cobalt based flux paste or cobalt and nickel based flux paste.

The brazing process may advantageously create a metallurgical bond which is stronger than the base materials of the wires and flux paste 40, with the flux paste 40 not only bonding adjacent cloth layers (30a and 30b in FIG. 6, 30A, 30B and 30C in FIGS. 7 and 9) but also, via capillary action resulting from viscosity during brazing and surface tension, filling gaps in the cloth layers 30a, 30b so as to prevent air or gas to pass therethrough, even when a pressure differential exists between opposite sides of the seal 20.

Thus, as illustrated in FIGS. 6, 7 and 9, after brazing, the remaining structure includes a plurality of cloth layers 30 with the material 50 remaining from the flux having created a metallurgical bond between the cloth layers 30 and also filling the gaps between the wires in the cloth layers 30 to prevent gas from passing therethrough.

As illustrated in FIGS. 6-9, the brazed together cloth layers 30 are also advantageously connected along the sides or edges by suitable edge connectors. In one advantageous embodiment, suitable shaped wire(s) 60, such as nickel or cobalt based rods, may be positioned along the edges of the multiple cloth layer 30 and then electron beam welded (with or without filler material) to the edges at the cloth and weld wire areas 64 adjacent one another at the top and bottom of the multiple cloth layers 30, thereby forming non-collapsible bulbs along edges of the seal 20. The sides may also be advantageously shaped or machined from pooled materials from an electron beam weld process, as described further below.

As illustrated, the weld wire 60 should have a height or thickness at least as much as the combined thickness of the fused cloth layers 30. For example, if two cloth layers 30 are fused together with a combined thickness of about 0.060 inch, a weld wire 60 having a round cross-section having a diameter of at least about $1/16$ (0.0625) inch, or up to about $1/8$ (0.125) inch, could advantageously be welded along the edges of the cloth layers 30. As another example, if three cloth layers 30 are fused together with a combined thickness of about 0.090 inch, a weld wire 60 providing a bulb height along the edge about 0.150 inch could be advantageously used.

It should be appreciated that electron beam welding of the edges could also be advantageously accomplished within the scope of at least one aspect of the present invention without the use of added wires or rods, with the welding being performed on the materials at the cloth layer edges and suitably shaped (e.g., by grinding) to the desired (e.g., bulbous) shape. That is, it should be appreciated that an electron beam weld process could be advantageously used without a wire 60, with the electron beam weld process instead dissolving the cloth material at the sides or edges, resulting in a bulbous mass of homogenous material along the edges which may be suitably shaped or machined to the desired size and shape.

Electron beam welding is accomplished by a tightly focused beam of high velocity electrons applied to materials such that the kinetic energy of the beam is transformed into heat upon impact to fuse the materials together. Advantageously, the concentrated heat of the beam reduces or eliminates the heat affected zone in comparison to conventional welding, with the controlled heat lessening weld induced stress and alloy depletion normally found with conventional spot welding.

Suitable fixtures may be used to position the cloth layers 30 and/or weld wires 60 during the high temperature manufacturing processes to facilitate proper positioning and integrity of the components and bonds during those processes.

It should be appreciated that manufacturing the seal 20 according to the present invention as disclosed herein by use of high temperature furnace brazing minimizes, if not entirely eliminates, heat affected zones normally associated with conventional welding. Further, durability of the main body of the seal 20 according to the present invention is improved by eliminating through spot welds, including eliminating previous repetitive directionally oriented through spot welds. Further, articulation of the multiple cloth layers 30 is enhanced as a result of the cloth layers 30 being fused together through the capillary action of brazing. Still further, it should be appreciated that electron beam welding along the edges of the seal 20 advantageously provides a desirable seal edge while also avoiding undesirable stress and alloy depletion at the edges.

The invention claimed is:

1. A seal for generally sealing a gas-path leakage-gap between spaced-apart first and second members of a turbine, comprising
    a first cloth layer having woven warp and weft wires, said first cloth layer having opposite edges extending a length;
    a second cloth layer having woven warp and weft wires, said second cloth layer having opposite edges extending a length;
    wherein said first and second cloth layers are brazed together by a flux paste whereby said cloth layers have their edges aligned and said brazing substantially seals gaps between said wires along substantially the entire length and width of the brazed together cloth layers;
    edge connectors connecting the edges of the cloth layers along their length, said edge connectors having a thickness greater than the combined thickness of the brazed together cloth layers.

2. The seal of claim 1, wherein said wires are cobalt based and said cloth layers are each about 0.03 inches thick.

3. The seal of claim 1, wherein the wires of said first and second cloth layers are woven in a Dutch twill weave.

4. The seal of claim 3, wherein each of said cloth layers have about 220 weft wires per inch and 40 warp wires per inch, with said weft wires having a diameter of about 0.0084 inch and said warp wires having a diameter of about 0.0105 inch.

5. The seal of claim 1, wherein said flux paste includes nickel, and said brazed connection of the cloth layers comprises the nickel of the flux paste filling gaps in the cloth via capillary action during brazing and forming a metallurgical bond with the wires.

6. The seal of claim 1, wherein the edge connectors comprise solid weld beads from an electron beam weld.

7. The seal of claim 6, wherein the solid beads are wires electron beam welded along the edges of the cloth layers.

8. The seal of claim 6, wherein the solid beads are cloth wire materials at the edges of the cloths electron beam welded and shaped as a bead.

9. The seal of claim 1, further comprising a third cloth layer having woven warp and weft wires and having opposite edges extending along a length, wherein said second cloth layer is brazed on one side to the first cloth layer and said third cloth layer is brazed to the other side of the second cloth layer by a flux paste with its edges aligned with the edges of the first and second cloth layers.

10. The seal of claim 9, wherein said brazed connection between said second and third cloth layer substantially seals the gaps between said wires along substantially the entire length and width of the brazed together cloth layers.

11. A turbine, comprising:
a first turbine member having a recess therein;
a second turbine member movable relative to said first turbine member, said second turbine member being spaced from said first turbine member with a gap therebetween and having a recess therein aligned with said first turbine member recess;
a seal against gas leakage through the gap between the first and second turbine members, said seal having
a first cloth layer having woven warp and weft wires, said first cloth layer having opposite edges extending a length,
a second cloth layer having woven warp and weft wires, said second cloth layer having opposite edges extending a length,
wherein said first and second cloth layers are brazed together by a flux paste whereby said cloth layers have their edges aligned and said brazing substantially seals gaps between said wires along substantially the entire length and width of the brazed together cloth layers, and
edge connectors connecting the edges of the cloth layers along their length, said edge connectors having a thickness greater than the combined thickness of the brazed together cloth layers;
wherein the seal is received in the turbine member recesses with the edge connector on one edge received in the first turbine member recess and the edge connector on the other edge is received in the second turbine member recess.

12. The turbine of claim 11, wherein said wires are cobalt based and said cloth layers are each about 0.03 inches thick.

13. The turbine of claim 11, wherein the wires of said first and second cloth layers are woven in a Dutch twill weave.

14. The turbine of claim 11, wherein each of said cloth layers have about 220 weft wires per inch and 40 warp wires per inch, with said weft wires having a diameter of about 0.0084 inch and said warp wires having a diameter of about 0.0105 inch.

15. The turbine of claim 11, wherein said flux paste includes nickel, and said brazed connection of the cloth layers comprises the nickel of the flux paste filling gaps in the cloth via capillary action during brazing and forming a metallurgical bond with the wires.

16. The turbine of claim 11, wherein said flux paste includes cobalt, and said brazed connection of the cloth layers comprises the cobalt of the flux paste filling gaps in the cloth via capillary action during brazing and forming a metallurgical bond with the wires.

17. The turbine of claim 11, wherein the edge connectors comprise solid weld beads from an electron beam weld.

18. The turbine of claim 17, wherein the solid beads are wires electron beam welded along the edges of the cloth layers.

19. The turbine of claim 17, wherein the solid beads are cloth wire materials at the edges of the cloths electron beam welded and shaped as a bead.

20. The turbine of claim 11, wherein said seal further has a third cloth layer having woven warp and weft wires and has opposite edges extending along a length, wherein said second cloth layer is brazed on one side to the first cloth layer and said third cloth layer is brazed to the other side of the second cloth layer by a flux paste with its edges aligned with the edges of the first and second cloth layers.

21. The turbine of claim 20, wherein said brazed connection between said second and third cloth layer substantially seals the gaps between said wires along substantially the entire length and width of the brazed together cloth layers.

22. The turbine of claim 11, wherein said seal is movable relative to both said first and second turbine members.

23. A method of making a seal against gas leakage through a gap between first and second turbine members movable relative to one another, comprising the steps of:
providing first and second cloth layers each with opposite edges extending a length, each cloth layer having woven warp and weft wires;
brushing a flux paste on substantially one entire side of one of said cloth layers, said flux paste being based on a selected one or more of nickel and cobalt;
positioning the other of said cloth layers against the one side of the one cloth layer;
brazing together said first and second cloth layers with their edges aligned whereby said selected one or more of nickel and cobalt of said flux paste substantially seals the gaps between said wires along substantially the entire length and width of the brazed together cloth layers; and
connecting the edges of the cloth layers with edge connectors along their length, wherein the edge connectors have a thickness greater than the combined thickness of the brazed together cloth layers.

24. The method of claim 23, wherein said providing step provides cloth layers which are each about 0.03 inches thick formed of cobalt based wires.

25. The method of claim 23, wherein the wires of said first and second cloth layers are woven in a Dutch twill weave.

26. The method of claim 23, wherein each providing step provides cloth layers having about 220 weft wires per inch and 40 warp wires per inch, with said weft wires having a diameter of about 0.0084 inch and said warp wires having a diameter of about 0.0105 inch.

27. The method of claim 23, wherein in said brazing step the selected one or more of nickel and cobalt of the flux paste fills gaps in the cloth via capillary action and forms a metallurgical bond with the wires.

28. The method of claim 23, wherein the edges connecting step comprises electron beam welding forming edge connectors which are weld beads.

* * * * *